(12) United States Patent
Harrington

(10) Patent No.: US 6,236,754 B1
(45) Date of Patent: May 22, 2001

(54) IMAGE MODIFICATION TO REDUCE SUSCEPTIBILITY TO MISREGISTRATION

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/004,282

(22) Filed: Jan. 8, 1998

(51) Int. Cl.[7] .................................................... G06K 9/38
(52) U.S. Cl. ............................................. 382/199; 382/266
(58) Field of Search .................................. 382/199–200, 382/266, 269; 358/530

(56) References Cited

U.S. PATENT DOCUMENTS

| | | | |
|---|---|---|---|
| 4,583,116 | 4/1986 | Hennig et al. | 358/75 |
| 4,700,399 | 10/1987 | Yoshida | 382/17 |
| 4,725,966 | 2/1988 | Darby et al. | 364/518 |
| 4,931,861 | 6/1990 | Taniguchi | 358/75 |
| 5,109,436 * | 4/1992 | Machida et al. | 382/50 |
| 5,113,249 | 5/1992 | Ysefi | 358/75 |
| 5,131,058 | 7/1992 | Ting et al. | 382/47 |
| 5,204,918 | 4/1993 | Hirosawa | 382/41 |
| 5,241,396 | 8/1993 | Harrington | 358/296 |
| 5,295,236 | 3/1994 | Bjorge et al. | 395/134 |
| 5,313,570 | 5/1994 | Dermer et al. | 395/131 |
| 5,386,223 | 1/1995 | Saitoh et al. | 346/157 |
| 5,386,483 | 1/1995 | Shibazaki | 382/22 |
| 5,402,530 | 3/1995 | Boenke et al. | 395/112 |
| 5,440,652 | 8/1995 | Ting | 382/165 |
| 5,513,200 | 4/1996 | Paoli | 372/50 |
| 5,542,052 | 7/1996 | Deutsch et al. | 395/131 |
| 5,613,046 | 3/1997 | Dermer | 395/109 |
| 5,615,314 | 3/1997 | Schoenzeit et al. | 395/114 |
| 5,666,543 | 9/1997 | Gartland | 395/788 |
| 5,668,931 | 9/1997 | Dermer | 395/104 |

\* cited by examiner

*Primary Examiner*—Thomas D. Lee
*Assistant Examiner*—Stephen Brinich

(57) ABSTRACT

A method for making continuous-tone, raster color images that are less susceptible to the effects of misregistration is described. For each pixel the present method determines the component-wise maximum positive color difference for the pixel from its neighbors. A fraction of this difference is then determined and then added to each pixel's color value, thus eliminating annoying white space between color transitioning in pixels. The particular fractional value is a function of the pixel's luminance.

8 Claims, 4 Drawing Sheets

Pixels

Pixels

Pixels

IMAGE MODIFICATION TO REDUCE SUSCEPTIBILITY TO MISREGISTRATION

FIELD OF THE INVENTION

The present invention is related to methods for trapping images wherein adjacent pixels within an image area use differing colors which sometimes result in an annoying white border between color transitions and, more particularly, to a method and system of trapping images rendered in a continuous tone raster wherein component-wise maximum positive colorant differences are determined from neighboring pixels for each pixel a fraction of said difference is then added to the pixel's colorant values resulting in values somewhere between the maximum neighboring and original values for each color component resulting in an image that is less susceptible to gaps because of misregistration at color transitions

BACKGROUND OF THE INVENTION

Color printing is typically carried out by printing three or four color separations, (eg. cyan, magenta, yellow and black). Intermediate colors are made by printing mixtures of various amounts of these primary colors. It is possible, however, to specify pairs of colors that have little or no common components. For example, pure cyan and pure magenta, or an orange made from yellow and some magenta and a dark cyan made from cyan and black If adjacent areas of an image use two such colors, then a potential problem arises. The problem occurs if the registration between color components is not perfect. If the color separations are not perfectly aligned, then a gap can occur at the boundary between the two colors and the white of the paper can show through. This is considered objectionable and a technique known as trapping is used to reduce it. Trapping is usually thought of as moving the boundary for one of the colored areas so that it overlaps the neighboring area. If one is dealing with graphical objects, this amounts to spreading or bloating an object, or in choking or shriking its background The layout of a page or graphic image depends upon combining "structured graphics" according to a pre-established graphic design The structured graphics are contiguous regions of color, usually represented in a plurality of separation images, which represent a succession of graphic objects imaged on the printing medium (e.g. the "paper"). The objects so imaged are shapes which can be isolated from each other, can abut one another at one or more points, can partially overlap one another, or can completely overlap one another. The resulting printed page or graphic image is therefore made up of a patchwork of shapes representing the graphic objects, some of which are "clipped" by objects imaged later in the succession.

The result of abutting or overlapping shapes is a boundary between adjacent regions of color which, under ideal printing conditions should have zero width. That is, the one color should stop exactly where the other begins, with no new colors introduced along the boundary by the printing process itself. The "colors" which fill the shapes can be solid colors, tints, degrades, contone images, or "no fill" (i.e., the paper with no ink applied). In general, the "colors" represented in these adjacent regions are printed using more than one colorant. In practice therefore, the realization of a zero width boundary between regions of different color is impossible as a result of small but visible misregistration problems from one printed separation to another. The error is manifested as a "light leak" or as a visible boundary region of an undesired color.

The problem of misregistration is a mechanical problem, almost always existing in printing systems. The problem arises because color separations are not laid exactly where intended, due to inherent imperfections in any separation registration process. It is somewhat correctable by mechanical registration methods; however it is rarely completely correctable. In expensive, high end printing processes, customers have high expectations that misregistration artifacts will not be visible. In inexpensive, low end printers, mechanical registration techniques are so expensive as to make correction or trapping essential.

As will become apparent, different printing technologies have distinct misregistration artifacts. Offset printing tends to have uniform misregistration in all directions. However, xerographic printing tends to have misregistration primarily in a single direction.

Methods for correcting for this misregistration are known in the prior art. The general approach is to expand one of the regions which abut so as to fill the gap or misregistration border region with a color determined so as to minimize the visual effect when printed Borders which are expanded from a region of one color to another in this manner are said to be "spread". A border which has been so expanded is referred to as a "trap", and the zone within which color is added is called the "trap zone".

Commonly used methods for automatic trapping of digital images fall into the categories of vector-based and raster-based methods. Vector-based methods rely on images that have been converted from a page-description language form, describing objects as characters, polygonal shapes, etc. into an internal data structure containing not only object information, but also a list of all the edges between regions of different color. Raster-based methods rely on images that have been first scanned or converted for page-description based form and are stored internally as a sequence of (high resolution) scan lines each containing individual scan elements or pixels. These methods process each raster line in sequence and compare one or more adjacent pixels to determine color boundaries. After some initial processing to find edges, both vector-based and raster-based methods apply rules for determining whether or not to create a trap at such boundaries, and finally apply a second set of rules to determine the nature of the trap if one is to be created.

Thus, it can be seen that most trapping processes takes the following format which shall be referenced throughout this discussion A. Find edges in the image, no matter how described;
    B. For each pair of colors on each side of the found edge, determine:
        1) Whether trapping should be used, and
        2) choose a method of trapping.
    Modify the image accordingly.

The present invention differs from this prior art in that there is no explicit finding of edges (no step A). It also differs from step B in that it does not try to decide whether or not trapping should be used; instead, it always applies its modifications to every pixel. Furthermore, there is no selection of a trapping method; its single modification scheme is universally applied. In the prior art, the method of Taniguchi, described in US-A 4,931,861, uses two rasterized images representing abutting or overlapping objects within an image field to define a third binary image representing the map of the pixels which make up the borders between the first and second images. These three images are superimposed, pixel by pixel, to create a fourth and final binary image.

The method of Darby et at., described in US-A 4,725,966, again defined on a pixel basis, uses a mask which is moved, one resolution element at a time, to evaluate the presence or absence of (pixel) colors upon which a positive or negative spread decision is based.

The method of Yosefi, described in US-A 5,113,249 uses a set of automated rules as the basis for deciding, for each pair of abutting or overlapping shapes whether or not to create a trap (an overlap region referred to as a "frame"), and, if so, the nature of the trap to create. The preferred embodiment described by Yosefi makes use of scanned data, and processes each line of pixels in order, comparing for each pixel three pixels from the previous scan line and two pixels from the same line to determine if a color change has occurred The decisions regarding whether or not to create a trap, and the nature of such a trap if created are imbedded within the processing sequence, making use of criteria established prior to the onset of processing. Yosefi describes rules to follow after finding an edge and knowing the two colors. There are 24 rules based on whether the colors are tints, special colors like gold leaf), black, yellow, "window" (meaning scanned image) and various combinations.

A commercially available product, "TrapWlse", from Aldus Corporation, Seattle Wash., also makes use of a raster approach to trapping. In this product, the processing time is proportional to the number of resolution elements, thereby increasing quadratically with resolution, and leading to greater computation times for high device resolution, e.g., 3600 dots per inch (d.p.i.). Furthermore, traps are created with this package using pre-set rules, and are not editable by a user without the requirement for repeating the computation.

US-A 4,583,116 to Hennig el al describes a trapping process that evaluates the darkness on both sides of an edge in order to determine which object determines the contour. The object determining the contour is left unchanged. The other object is spread under it. The fill is constant, and matches the value of the separation being spread The "darkest" separation is used to determine the contour and kept constant, while the lighter separations are all spread US-A 4,700,399 describes a method that finds edges and uses a different Undercolor Removal (UCR) scheme along the edges from elsewhere to allow rich black without getting color bleeding along the edges of black objects. The method requires keeping colors away from edges of black text US-A 4,931,861 to Taniguchi describes using binary operators to shrink or spread a shape where another shape is overlapped in another separation (thresholding is used to get these shapes). Also described is spreading where two shapes are adjacent, and do not overlap.

US-A 5,131,058 to Ting et. al. converts a raster to an edge-based "outline" representation Then the outlines are spread and the resulting image is re-rasterized. Spreading is done separation-wise with a process indicating whether there is a color difference that warrants spreading/choking.

US-A 5,295,236 Bjorge, et. al. may represent the Adobe or Aldus TrapWise product described above. This patent describes ways of deriving the information about edges required to trap, trapping with some simple rules, and converting the traps to vectors which are converted back to PDL form.

US-A 5,204,918 to Hirosawa assumes vector data as input, describing the contours, i.e., no edge detection is performed. Image parts are selected in order of increasing priority. For parts of a contour of an image part where there is a lower priority image part adjacent, two supplemental contours are generated These are offsets at a specified distance from the original contour. A new color is computed for the entire offset region (both sides of the original, not just where there is another object). The maximum density of the two sides is used in the correction region. Minimum density might be used instead The edge following required is either done in a frame buffer, or directly on vector data.

US-A 5,402,530 to Boenke et al. uses a Page Description Language (PDL) input, and builds a data-structure using a modified Weiler algorithm to represent the contours. It is object-based, in that it considers four classes of object: interior fills, strokes on the borders of regions, text on top of regions, and text on its own.

US-A 5,386.223 to Saitoh et al. addresses two-color printing, extending one color into another where they abut It suggests that it is desirable to extend the lighter color.

US-A 5,542,052 to Deutsch, et. al claims a set of geometric rules. First, a relative darkness to each color is assigned, with magenta being the darkest color, cyan being a middle darkness color, and yellow being the lightest color. Then, the lighter color is spread under the darker color. A trap vector is drawn in a color which is a function of the two colors abutting each side of the edge.

US-A 5,313,570 to Dermer, et. al. takes either raster or PDL input, and creates an intermediate, vector-based form The manipulations themselves are based on a plane sweep algorithm generating a display list and then from that display list generating a new representation called a scan beam table. The active edge table has a polygon stack for each edge. From these representations, a boundary map is generated US-A 5,668,931 to Dermer describes trapping rules. The overall concept is to have a set of evaluation methods, and for each candidate trap, let each of the evaluation method decide whether it is an optimum trap. Each method ranks all of the candidate traps, and then the traps are scored, using the weighted sum of the rankings. In this way some evaluation methods are more likely than others. Candidate traps appear to consist of the typical spreads and chokes, although they mention that reduced amounts are also possible The evaluation methods are as follows: 1) For each possible misregistration, determine the minimum distance in CIE-LUV from the two bounding colors, and then use the maximum of those minima as a score; 2) Determine the CIELUV distance from the trap color to the color into which it is spread; 3). For each misregistration, determine the difference in L* values from each of the bounding colors, with the score set as the maximum value of the set —i.e., favoring relatively darker misregistration colors; 4) For each misregistration color, determining the absolute difference in L* value from each bounding color, so that the score is based only on lightness differences; 5) Determine the L* value of each misregistration color, with the score indicating dark misregistration colors. 6) Determine the L* of the bounding colors and assign a score equal to the absolute difference in L* when a dark color is spread into a light, or zero when a light color is spread into a dark, penalizing the former; 7) Use the highest percentage of yellow in a misregistration color. The weights are determined empirically, and can be adjusted over time, or as a particular application demands. They are initially determined by a least squares process based on expert evaluation of a number of calibration traps.

US-A 5,613,046 to Dermer describes a user interface allowing the display of an image, and selection of any color, pair, object, edge or color and modification of the trapping behavior in terms of inward/outward, or what color, how automatic or manual to be, etc. It also allows display of the effect of any of the 16 possible misregistrations on the selected color pair, object, edge or color, with or without the current trapping applied, and to iterate through the possible modifications, applying several possible traps and see which is best US-A 5,440,652 to Ting describes a process to find an edge and track it, building a secondary edge during processing. The secondary edge will be used as the other side of the trap region. The placement of the secondary edge and the color of the region between is determined by reference to a rule base.

US-A 5,615,314 to Schoenzeit et al. describes a basic architecture for a RIP - printer interface. It includes buffering and queues and compression for transferring page images to the printer from the RIP. It also has control information, in particular, multiple copy and abort instructions. It also provides an optional dilation processor which "selectively dilates objects" in order to compensate for potential misregistration errors. There is no indication of how it selects. It dilates using "standard convolution techniques" such as taking the max of a 3×3 neighborhood.

US-A 5,513,300 to Shibazaki describes trapping rasters against line art. They are concerned with the image and line art being at different resolutions. Line art is stored as run length data, and images as raster. The method forms a mask indicating where the image appears, and erodes or dilates the mask The non-exempt separations of the image or line art are then copied into the eroded or dilated regions (respectively). A separation is exempt if the operator so indicates.

US-A 5,386,483 to Shibazaki discusses finding a trapping region in a raster-based image. The image is segmented into regions, each of a constant color. Each such region is assigned a region number, and a lookup table is used to store the correspondence between region number, and colors, including both CMYK, and RGB. RGB is used by the operator supervising the process with a display and mouse. The data is then run-length encoded, using runs of color table indices. The algorithm is multi-pass. On the first pass, an eight-neighbor window is used to form a pair of "frame" regions along each color boundary. On subsequent passes, a four-neighbor set is used to extend the frame region. Finally, a color is assigned to each new region thus formed. To form a "frame"region, a three scanline buffer is used The center pixel in a window is considered to be in the frame region if 1) the pixel is located in one of the original regions (i.e., not already in a frame region), and 2) at least one neighbor is in a different region. Regions/colors have priorities specified (by the user). When the neighbor with the highest priority is part of a frame, the frame number is used for the new region of the pixel. Otherwise, a new frame number is allocated and used It appears that priorities don't change when pixels are assigned to frame regions.

US-A 5,241,396 to Harrington describes a simple raster-based technique for protecting rich black text. Black separation images are eroded to and then ANDed with each of CMY, to produce new cyan, magenta and yellow separations. The original black is then used as the black separation.

US-A 4,700,399 to Yoshida finds edges and uses a different UCR along the edges from elsewhere to allow rich black without getting color bleeding along the edges of black objects. Colors are kept away from edges of black text.

US-A 5,666,543 to Gartland and US-A 5,542,052 describes an arrangement providing a prolog substituted to turn on trapping. The prolog instructs the Raster Image Processor (RIP) to build a "shape directory" and then to trap the objects in the shape directory. The shape directory appears to be a back-to-front display list. Objects are processed in the back-to-front order. If they overlap existing objects, they are trapped against thee If the existing object already has been trapped, the traps are undone before the new traps are introduced Thus traps are introduced as objects are processed, possibly causing a region to be trapped and re-trapped as the traps are covered up. The decision of whether to trap includes text point size and changes in separation strength.

The trapping methods described in the above cited prior art references have two common features: The first is that most process images represented in raster form and seek edges at which to apply their trapping. This places a requirement for extra processing steps in images which constitute primarily structured graphics or which combine structured graphics with contone images. Such images must first be rasterized at the output resolution, and then the appropriate line-scan algorithm applied. They must also employ some edge detection scheme to identify edges where trapping should occur.

The second common feature of prior art methods is the necessity to make and apply trapping decisions within the processing based upon pre-established criteria For raster based processing at high output device resolution, the potential number of pixel-to-pixel color transitions is large due to repetition of transitions corresponding to a single color region border shared by many scan lines.

Many rule-based methods exist in the prior art for automatic determination of the particular trap to be specified for a given combination of bounding colors. For example, in U.S. Pat No. 5,113,249 to Yosefi, a set of logical tests is used in sequence to differentiate between pre-established generic color-pair categories, with a rule applied to each color pair. Such built-in rule systems attempt to replicate the human aesthetic judgment used in manual specification of traps and each can provide results satisfactory to an "expert" user in most cases while failing to do so in other special situations. The specification of a trap at the boundary between two color regions does not in itself eliminate the misregistration of printing plates, but reduces the visual effect of misregistration within the trap zone through proper choice of the trap operation. In the event of plate misregistration involving a color separation for which a trap has been specified, additional "secondary" effects occur.

The above patents and particularly US-A 5,313,570 and US-A 5,668,931 to Dermer, and US-A to Yosefi are hereby incorporated by reference for their teachings.

SUMMARY OF THE INVENTION

The problem of reducing image susceptibility to misregistration is simply resolved by the present invention which offers an alternative to conventional trapping approaches. With the present invention, another way of achieving trapping is presented wherein one does not seek to locate and modify objects and the boundaries, but rather applies a potential modification to every pixel. The modification is such that its effect is greatest on boundary areas and least on regions of uniform color. This approach applies even when there is no distinct boundary between objects such as when image components have "soft" edges, or when edges are blurred as is usually the case with scanned object or objects rendered with antialiased edges. Where a boundary exists, the effect of this method is to create a border along the boundary of the two colors within an image. By implementing the method of the invention this border will contain the color components from both of the adjacent colored areas. Therefore, the effects of misregistration between color components can be reduced when the gap which can occur at the boundary between the two colors is filled with a color component representing both color boundaries. Thus, the white of the paper no longer shows through in this gap.

The method takes the following general steps in protecting against misregistration:

component-wise maximum color differences are determined for each pixel from neighboring pixels; and a fraction of said difference is then added to said pixel's color value. A difference between a pixel (pixel a) value and its set of neighboring pixels (pixel ith) is calculated and the value of pixel a is modified, said change effected by adding a fraction of color components Cx, Mx, Yx, Kx to the colorant specification for pixel a (Ca, Ma, Ya, Ka), wherein the change values relate to the amounts of neighboring colorant that are missing from pixel a. The color difference is added in a fraction t so the modified pixel value will be given by Ca'=Ca +t=Cx, Ma'=Ma +t =Mx, Ya'=Ya +t =Yx, Ka'=Ka +t =Kx, wherein fraction t will depend upon a property of pixel a such as its luminance of pixel a The method can be carried out with hardware or in a system comprising a microprocessor programmed to carry out the above steps of the method Other advantages and salient features of the invention win become apparent from the detailed description which, taken in conjunction with the drawings, disclose the preferred embodiments of the invention.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

The need for trapping or other protection from misregistration arises when two colors without significant common colorant amounts abut. Having a border region along a boundary between two such colors, where the border contains all the color components of the adjacent colors, prevents a white gap from showing when the separations are misregistered. Instead, the border just becomes thicker or thinner.

Now consider the question of what should the border color be. One answer is that each of its CMYK color components should be the maximum of corresponding component values of the two region colors, but this not always necessary or desirable. Picking the maximum component values can give a dark border color and can draw attention to the boundary. An alternative is to use a value somewhere between the maximum and minimum values for each component. Using an intermediate value can make the boundary less conspicuous and still fill in any gaps with some color darker than white. (One must be a little careful here to also consider the halftoning since a light color in a coarse halftone may appear as a chain of spots within the gap and may draw attention to the gap rather than reduce its visibility.)

Figure 1:
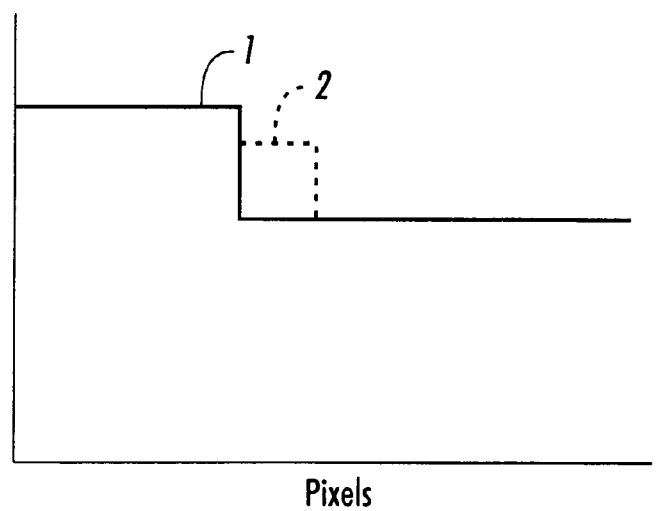
FIGS. 1 and 2 illustrate a simple pixel change where only one color is present, and the changes relationship to luminance and the amount of colorant applied to the pixel.
Figure 2:
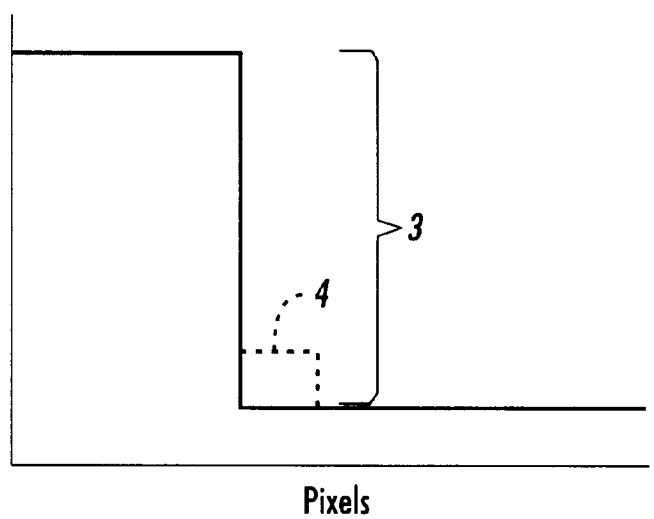

Referring to FIGS. 1 and 2, simple pixel changes are illustrated where only one color is present We will assume for purposes of these examples that the color is magenta and the colorant amount is represented by the vertical portion of the graphical illustrations. The horizontal portion of the graph represents the pixels wherein the graph depicts a drop from one pixel's magenta value to a second pixel's magenta value. As shown in FIG. 1, the change in colorant from pixel to pixel occurs at the drop point I wherein a strong change is reflected based on the amount of magenta between pixels. Given the amount of change that is a small step downward, a strong change 2 in colorant is added to the second pixel because the still substantial magenta level means the luminance is low on this graph. Now, referring to FIG. 2, a much larger drop 3 is presented (large step). While this provides the potential for a large modification, the actual modification 4 is relatively small. This is because the amount of colorant is low at this point and so the luminance is high. Colorant is therefore added based on the step size, and luminance is accounted for (where darker =less change).

Figure 3:
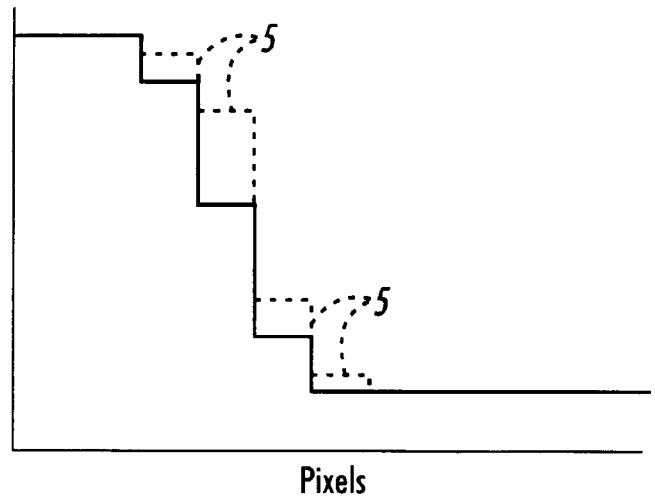
FIG. 3 illustrates pixel changes where each step represents a different pixel and all modifications, represented by steps, occur at once with a single colorant (e.g., magenta)..

Referring to FIG. 3, multiple pixels are presented with differing changes in step size. This shows the behavior of the technique on a soft or blurred edge. The color will still be magenta for purposes of this example. As seen in the figure, pixel modification 5 occurs on several steps at once based on the colorant and luminance values of each pixel's neighbor.

Figure 4:
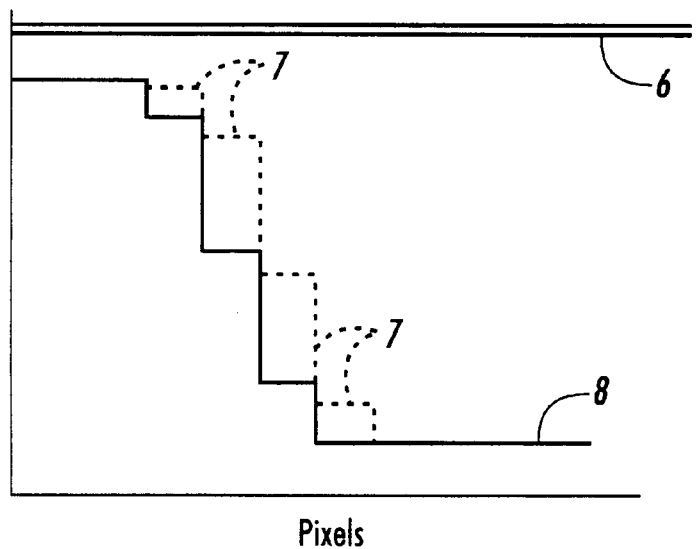
FIG. 4 illustrates greater colorant changes to pixels where an additional constant colorant (e.g. cyan) is present

Referring to FIG. 4, two colors are now introduced Cyan 6, for example is a constant color level within the image. Magenta 8 on the other hand is changing. The method modifies the magenta changes 7 according to each pixel's value and the values of its neighbors. Note that bigger changes 7 over the corresponding steps 5 in FIG. 3 are reflected because of the presence of cyan 6 as a constant, which reduces the amount of luminance in all pixels for FIG. 4.

One does not have to choose a single trapping color along the edge. Actually two trapping colors can be used, one on each side of the edge. So, for example if we had a cyan region next to a magenta region, we could draw a border on the cyan side with a little magenta added to the cyan. We could also include a border on the magenta side where a little cyan is added to the magenta. This invention suggests a way to automatically construct these borders. The key is to use a in property such as the luminance of a pixel to decide how much of the difference from its neighbors should be added to its color in order to protect against misregistration. In this method, one does not have to explicitly search for edges. Instead, one can simply utilize the color difference between a pixel and its neighbors and apply the method to all pixels. If there is no edge, then this difference will be small and little change will occur. This is different from prior art which has required the identification of edges.

Figure 5:
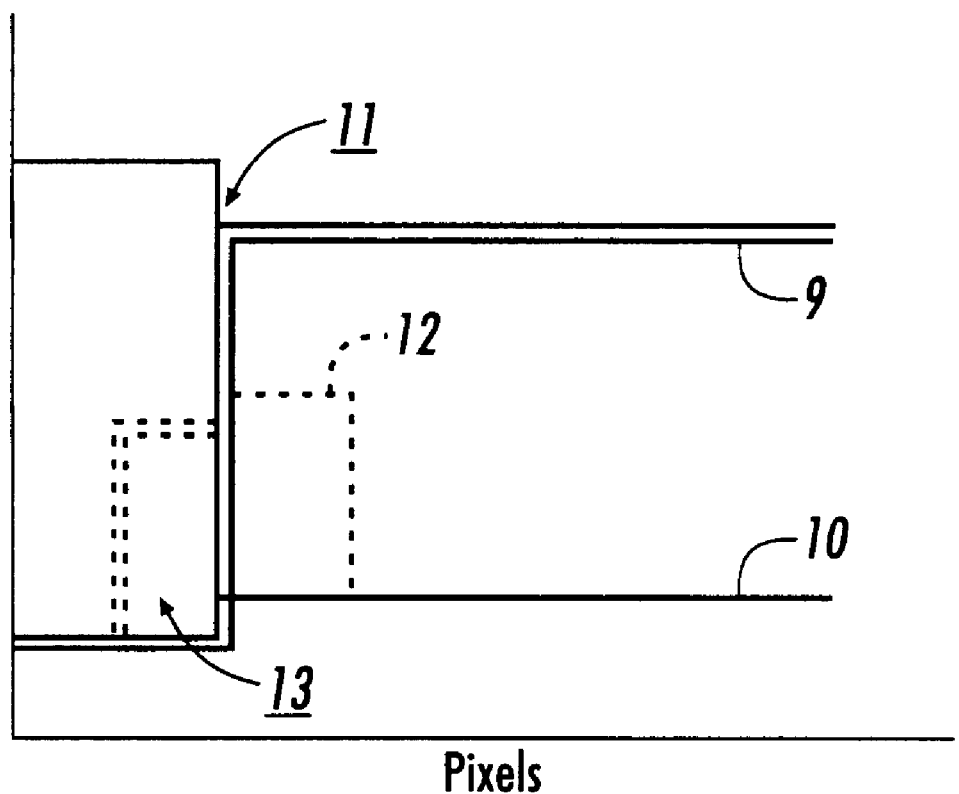
FIG. 5 illustrates a change scenario where two colorants/ pixels abutt with two colorants (cyan and magenta) and low luminance on each side produces a strong change in colorants.

Referring to FIG. 5, two pixels with a strong mixture of colorants abut each other. For this example magenta 10 is largely represented in the area to the left of the edge 11, but then falls to a lower value on the right of the edge 11. Cyan 9 takes an opposite approach in the graph, transitioning from a lower value on the left to a higher value on the right. As seen by the adjustment (10, 13) low luminance on each side of the edge 11 provide for strong change in cyan correction 13 on the magenta side and magenta correction 12 on the cyan side of the example image.

This method is intended for images that have been rendered to continuous-tone rasters. It does not require knowledge of particular graphic objects or their shapes. It can be used with digital copiers as well as printers. It can be applied when the image is complete and avoids the problems of trapping along artificial boundaries that are later removed. This situation can arise when an object is constructed from several components (e.g. when a sweep is constructed from a series of rectangles.)

This method is primarily applicable to graphics and text. It is probably not appropriate to images. It should be used only for continuous-tone objects and should not be used for halftoned objects (e.g. a scanned halftoned image) as it could severely alter the color of a halftoned region. A more detailed description now follows:

Given two color specifications Ca Ma Ya Ka and Cb Mb Yb Kb we can determine the amount of colorant in color b that is absent from color a. For the cyan component this is Cba =max(0, Cb−Ca). Similarly the other components can be calculated Mba=max(0, Mb−Ma), Yba=max(0, Yb−Ya), Kba=max(0, Kb−Ka). For the difference between the color of a pixel and its set of neighboring pixels we can find the maximum difference from the set of neighbors for each component. Cx=max(C1a, C2a, C3a, C4a, . . .) where Cia is the positive difference as calculated above between pixel a and its ith neighbor (Note that an equivalent calculation is to find the maximum of differences for a color separation for all neighbors and then take the maximum of this result with zero.). Similarly we can find Mx, Yx and Kx. We are going to modify or replace the value of pixel a. If pixel a is in a region of uniform color our modifications will leave its value unchanged. If, however, pixel a lies on the boundary between two regions we will change its color to supply trapping to that boundary. We do this by adding a fraction of the color components Cx, Mx, Yx, Kx to the colorant specification for pixel a (Ca, Ma, Ya, Ka). I pixel a is in a region of uniform color, then the Cx, . . . values will be zero and a will not be changed, but if a lies on a boundary, the difference in color across the boundary will be reflected in the values of Cx, . . . These values give the amounts of the neighboring colorants that are missing from a, so supplying them will trap the edge.

For a trapping region up to two pixels wide we can use the four immediately adjacent pixels (above, below, right, and left) as a pixel's neighborhood. For wider trapping regions one can use the 8 neighbors, or 12, or 20 or 24. The more distant the pixels examined for color differences, the wider the trapping region.

Figure 6:
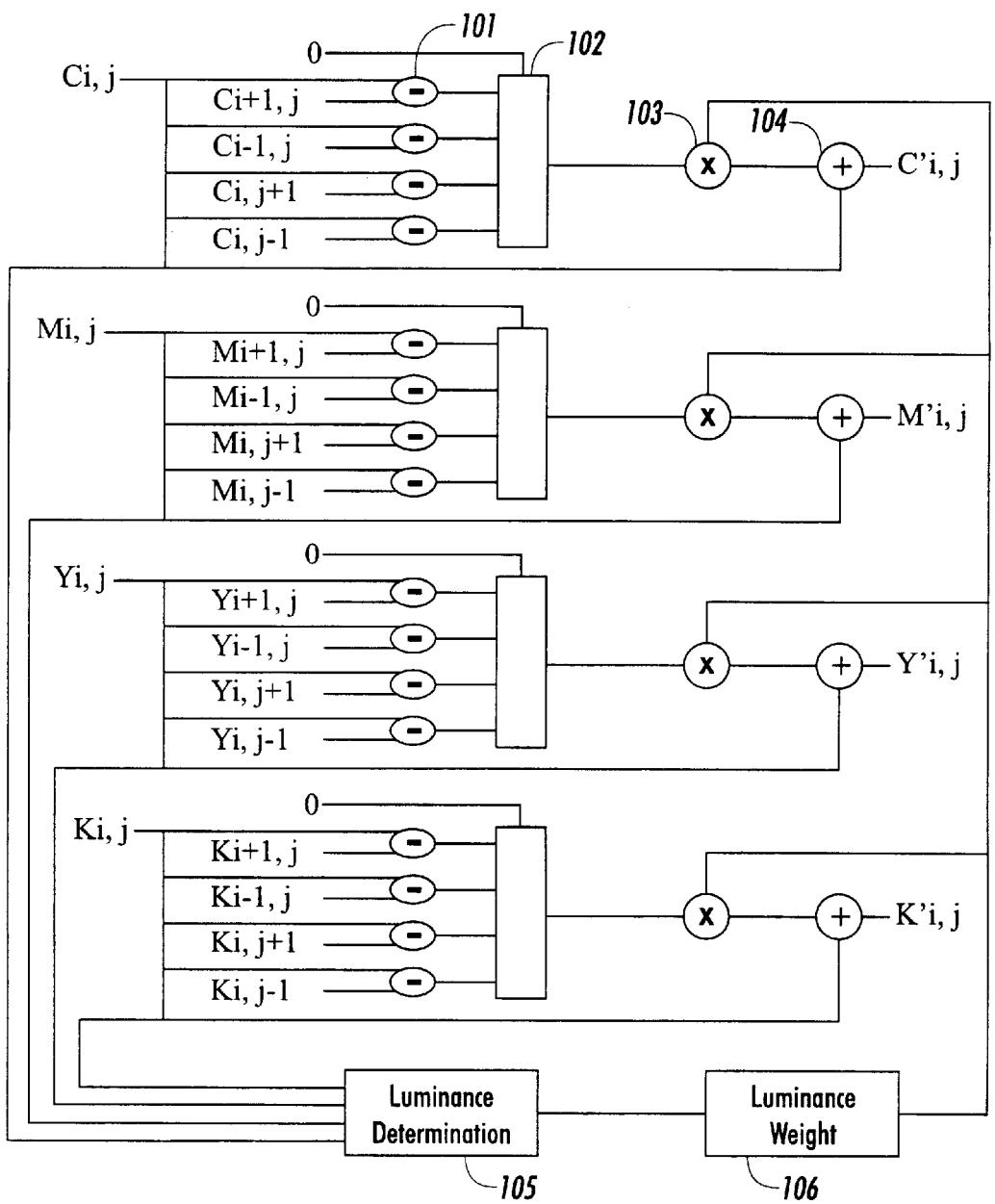
FIG. 6 illustrates a block diagram of the system components for the invention.

We only add in a fraction t of the color difference so the modified pixel value will be given by Ca'=Ca+t * Cx, Ma'=Ma+t * Mx, Ya'=Ya+t * Yx, Ka'=Ka't * Kx. This correction is illustrated in the hardware of FIG. 6 which is explained more fully below. The fraction t will depend upon the color value of the pixel a. One approach suggested by the trapping rules known in the art is to make the fraction t a function of the luminance of color a. For dark colors the color shifts and additional darkening due to the addition of the x colorant amounts will be hard to see and a white gap will strongly contrast, so a value of t near 1 is appropriate. For light colors, any gap will not be so visible, while the addition of foreign colorant amounts will be apparent, so a value of t closer to 0 is desired. The luminance of color a can be calculated according to the properties of the marking device, but a precise calculation is not necessary; a rough estimate is sufficient. If the red, green and blue components are known, the luminance might be approximated as L=0.3 * Ra+0.6 * Ga+0.1 * Ba. The RGB values can be calculated from models such as the Negebauer equations, but are often approximated from the CMYK values by simpler expression such as Ra=1−(Ca+Ka), Ga=1−(Ma+Ka), Ba=1−(Ya+Ka). Different approximation may be used depending on the halftoning scheme employed. A table lookup can be used to find the fractional value t for a given luminance L (I.e. t=T[L]) so the actual function can be whatever best suits the behavior of the marking device. This function can be determined empirically by printing test patterns with color boundaries for colors with the luminance of interest, and seeing what trapping factor gives the optimum result.

We have described the process using CMYK color coordinates, but other coordinates are possible. One need not have converted to ink amounts in order to protect against misregistration. Color fidelity is being sacrificed to trapping and so only rough estimates of colorant amounts should be needed. One could, for example use RGB coordinates by means of the translation given above. One might also consider using different trapping amount functions T[L] for each of the color components.

The invention can be carried out with hardware as illustrated in the block diagram of FIG. 6. The system has a means to determine the value of the fraction based on neighboring pixel luminance. The system determines pixel luminance which is utilized to determine the optimum neighboring value that should be added to protect against misregistration. [The left side of FIG. 6 shows the input of the color-component values for the pixel at location i, j (i.e. Ci,j, Mi,j, Yi,j, Ki,j). The values for neighboring pixels are also input; for example, the cyan components for the neighboring pixels are Ci+1,j, Ci−1,j, Ci,j+1, CI,j−1. The differences between the pixel value and the values of its neighbors (e.g. Ci+1,j−Ci,j) are determined in input modules 101. Calculation of the maximum value of the four differences and zero is provided within the comparing modules 102 for each input. The original pixel values are also fed to a luminance calculating module 105 that determines an approximate luminance value and feeds this to weight generating module 106. Note that module 106 may be implemented as a simple look-up table. The maximum differences are then scaled by the weight at scale modules 103 for the four colors. The scaled result is then added to the original colorant values at summing modules 104 to give the modified colorant amount for each output. The invention can also be carried out in a microprocessor-based system that is programmed to determined he component-wise maximum color differences for pixels from neighboring pixels and adding a fraction of the difference to the pixels color values. The system is programmable to utilize up to two pixels wide for four immediately adjacent pixels as a pixel neighborhood during trapping involving a region up to two pixels wide. For wider trapping regions a system can be developed based on the teachings herein that can use the 8, 12, 20 or 24 neighbors.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

What is claimed is:

1. A method for making images less susceptible to misregistration, wherein:

for a given pixel (pixel a), determining at least a component-wise maximum positive color difference between the given pixel and at least a selected one (pixel b) of the neighboring pixels; and adding a fraction of said difference to the color value of pixel a to provide a modified pixel a';

wherein the value of said fraction is a function of the color value of pixel b.

2. The method of claim 1 wherein the color value of pixel a is provided according to a first color separation and the color value of pixel b is provided according to a second color separation and wherein different functions are used for each of the first and second color separations.

3. The method of claim 1 wherein the value of said fraction is a function of the luminance of at least one of said pixels a and b.

4. The method of claim 1 wherein pixel b is selected from among the pixels immediately adjacent to pixel a.

5. The method of claim 1 wherein pixel a has a set of neighboring pixels $b_1, b_2, \ldots b_{ith}$, wherein pixel a and the set of neighboring pixels as described according to first and second color specifications, Ca Ma Ya Ka and Cb Mb Yb Kb, respectively, wherein the maximum difference is determined from component maximums Cx, Mx, Yx and Kx of the set of neighboring pixels as follows:

Cx=max(C1a, C2a, . . . Cia)

Mx=max(M1a, M2a, . . . Mia)

Yx=max(Y1a, Y2a, . . . Yia)

Kx=max(K1a, K2a, . . . Kia).

6. The method of claim 5 wherein the modified pixel values Ca', Ma', Ya' and Ka' are given by Ca'=Ca+t * Cx, Ma'=Ma+t * Mx, Ya'=Ya+t * Yx, Ka'=Ka+t * Kx, wherein the fraction t depends upon the color value of pixel a.

7. The method of claim 5 wherein the four immediately adjacent pixels to pixel a comprise the set of neighboring pixels.

8. The method of claim 1 wherein said method is carried out in a microprocessor programmed for trapping an image by determining color differences for each of a plurality of said given pixel a, within a selected region of said image, from respective pluralities of neighboring pixels.

* * * * *